Patented Jan. 17, 1950

2,494,766

UNITED STATES PATENT OFFICE 2,494,766

MILLING ISOBUTYLENE-MULTIOLEFIN COPOLYMER SYNTHETIC RUBBER PRIOR TO CURING

Irving E. Lightbown, Westfield, N. J., and William J. Sparks and Robert M. Thomas, Baton Rouge, La., assignors, by mesne assignments, to Jasco, Incorporated, a corporation of Louisiana No Drawing. Application December 17, 1947, Serial No. 792,334

7 Claims. (Cl. 260—85.3)

This invention relates to the processing of synthetic curable copolymeric elastomers; relates particularly to a processing treatment for increasing the tensile strength and homogeneity of such polymers; and relates especially to the step of applying a heavy mechanical working at elevated temperatures to improve the curing properties of curable, low iodine number, olefinic, synthetic polymers.

It has been found possible, by a low temperature treatment with a catalyst, to produce olefinic copolymers or interpolymers which are strongly rubbery in character. These elastomeric copolymers are composed of substantial amounts of isobutylene; usually, but not necessarily, present in major proportion, with significant to substantial amounts, also usually, but not necessarily, present in minor proportion of multi-olefins having from 4 to 14 carbon atoms per molecule such as butadiene, isoprene, dimethyl butadiene, myrcene, and 2-methyl 3-monyl butadiene-1,3 hexatrine, diisobutenyl, 2-methyl-hexadiene 1-5; 2,4,6 trimethyl - 1,3,5 - heptatriene, allocymene, 2 methyl 3 monyl butadiene-1,3; and the like. These polymers are prepared at temperatures ranging from —40° C. to —103° C. or lower to temperatures as low as —164° C. by the application to the mixed polymers of a dissolved active metal halide catalyst or Friedel-Crafts type catalyst, such as aluminum chloride in solution in an apropriate low freezing inert solvent. These interpolymers are susceptible to a curing treatment with such substances as sulfur in the presence of certain sulfur compounds, or in the presence of organic compounds which contain a quinonoid nucleus of the benzene or naphthalene series. However, difficulty has been encountered in the curing step because of a tendency on the part of the interpolymeric materials to develop bubbles or blisters of flaws within the body of the material during the forming and curing operations, which difficulties markedly and seriously reduces the tensile strength of the cured material.

It is now found that if the material as received from the polymerizing process is subjected to a severe mechanical working or masticating a milling treatment at an elevated temperature for a substantial period of time, the tendency to form blisters, flaws, bubbles and weak spots in the material in subsequent operations is removed and a very substantial improvement in tensile strength, elongation, and flexure and abrasion resistance is obtained. The reason for this improvement is at the present time wholly unknown and no proof of the character of the reaction presumably occurring in the material during the heavy milling treatment has been obtained. However, it is suggested, and it may be, that during the hot working treatment, some interfering substance is removed. This substance may be traces of low polymers which have a boiling point below the curing temperature, these low polymers being removed either by volatilization or by further polymerization; or it may be that minute traces of water are removed, or it may be that catalyst residues or complexes produced in the reaction are either driven out or neutralized. The elimination or neutralization of such constituents has been found to have a marked effect on the character of the ultimate product; in particular, having a profound influence upon the ease and efficiency of extruding and upon the character of the curing reaction, since the untreated polymer shows bad blistering both during extrusion and under the heat incident to the curing step. The blistering takes the form of a very large number of blisters of a wide range of sizes; each blister yielding a discontinuity in the body of the material, thereby greatly reducing the tensile strength. This loss in properties is found to occur with all of the various types of low-unsaturation copolymers and with all of the various curing agents which are used with these copolymers. The processing treatment is preferably conducted in a Banbury type of mill at a temperature between 150° C. and 200° C. for a period ranging from about 5 to about 30 minutes. Alternatively, however, the processing may be conducted upon a double roll mill, again at a temperature within the same range and for a similar length of time, or in analogous masticating equipment which will produce heavy working pressures at high temperatures.

Thus an object of the invention is to treat a hydrocarbon copolymer material by the application thereto of a drastic milling process at an elevated temperature for a prolonged period, as a preliminary to adding curing ingredients extruding and curing the copolymer for the production of a material having high tensile strength, high elasticity and substantial uniformity througout the body of the material; and for the increase of the flexure and abrasion resistance as well as suitability for blending with other polymaterials. Other objects and details of the invention will be apparent from the following description.

Broadly, this invention applies to the treatment of olefinic interpolymeric materials by an operation of severe milling and heating, of a character not tolerated by other rubber-like substances, such as caoutchouc. This treatment has been found to yield a very substantial improvement in the physical characteristics of the polymer material, and it is in sharp contrast to the treatment applied to other rubbers, which are rapidly broken down into lower molecular weight substances or converted to insoluble resinous materials by such high temperature treatment. For this reason the uniform practice with rubber and other rubber-like materials has been to subject them to a minimum amount of milling, at the lowest temperatures for the shortest possible times and at the lowest pressures consistent with the obtaining of the desired plastic and homogeneous condition, since it is found that drastic treatment such as that applied to the present copolymer by the process of this invention would in general impair the properties of the rubbers. In sharp contrast with this requirement of gentle treatment by all of the prior rubbery materials, the present polymeric substance is greatly improved by a severe milling treatment. This property of substantial improvement in the strength, homogeneity and other characteristics of the olefinic polymers and interpolymers by the application thereto of the above mentioned drastic milling treatment, appears to be unique to these low temperature olefinic interpolymeric bodies. It may be noted that this problem of blistering is unique to the present copolymeric materials. Rubber, (caoutchouc) mixes readily with the desired compounding agents, and cures readily and only deliberate intent will yield blisters in it. Similarly, the emulsion type of copolymers such as the copolymer of butadiene with styrene known as Buna S and the copolymer of butadiene with acrylonitrile known as Perbunan also do not normally blister during curing reaction; and while all of these materials are commonly treated in the Banbury mill or on the double roll mill, no such blistering phenomena as are encountered with the present copolymer, occurs with them.

It may be noted that standard compounding practice for rubber utilizes both the Banbury mill and the double roll mill for the compounding step and the milling procedure exerts a profound effect upon the substance processed. It is entirely possible to obtain a breakdown of natural rubber in the Banbury mill to the stage where it is little more than a heavy oil. However, rubber, even broken down to this condition, contains enough unsaturation (the iodine number of rubber normally being about 350) so that upon curing, the molecular weight is rebuilt and the firm solid character of the rubber gum restored. This, however, cannot be done with the copolymer of isobutylene and a multi-olefin, since the small amount of unsaturation present makes it impossible to build up the molecular weight if it is too low originally or if it is broken down by any means.

Similarly, polybutene has been compounded in the Banbury or on the double roll mill for the mixing in of various substances, and also for the purpose of breaking down the molecular weight when it is too high for desired use, such as addition to a lubricant. In the case of simple polybutene, however, the material cannot be vulcanized by conventional means and none of the usual vulcanizing agents react with it to increase the tensile strength. Polybutene has been treated with sulfur chloride, to add both sulfur and chlorine to the molecule, but this is a hardening action, to produce a material much like factice, which does not increase the tensile strength. Furthermore, no question of blistering ever arises with polybutene. In the first place, since it cannot be cured by commercially feasible means, no permanent blisters can be formed in it, but any inclusions of extraneous matter, gaseous, liquid or solid, are easily worked out and removed, and the inherent stickiness prevents the formation of any blisters. Accordingly, milling of polybutene has been, and can be, practiced only for the purpose of mixing in compounding substances, and no question of loss of tensile strength from the presence of blisters can ever arise.

In practicing the present invention, the materials to be processed are prepared by a low temperature polymerization reaction. The raw materials include isobutylene, as the mono-olefinic component.

As the diolefinic component of the mixtures, the preferred substances are butadiene, isoprene, dimethyl butadiene and piperylene. It may be noted that in general, all carbon compounds having from 4 to 14 carbon atoms; and more than one carbon to carbon double linkage; that is, two or more ethylenic linkages in the molecule, are usable, without regard to the relative positions of the double linkages, whether they are conjugated or non-conjugated and without regard to the presence of substituents of any sort. That is, the multiple unsaturated ethers such as the ether of butadiene and methane or ethane, are entirely satisfactory copolymerizates; similarly, di-allyl ether is usable as a multiple unsaturated copolymerizate. It may be noted that the preferred copolymerizates are the substituted butadienes containing a methyl group on the "2" carbon, since these compounds copolymerize with the most smoothness and ease; and the condition of conjugation appears to be, in some ways, helpful. However, none of these are essential requirements since butadiene as such is an excellent copolymerizate; 1,4 dimethyl butadiene is a satisfactory copolymerizate; 2,3 dimethyl butadiene being, however, somewhat superior; myrcene also being an excellent copolymerizate.

The mixed olefinic material is cooled to a temperature ranging from −10 to −150° C., preferably to temperatures ranging from −78° C. using solid carbon dioxide to −103° C. when using liquid ethylene. Cooling may desirably be accomplished by the addition directly to the olefinic material of the refrigerant whether solid carbon dioxide or liquid ethylene or other of the non-reactive refrigerants, such as liquid propane, liquid ethane, or liquid methane. Alternatively, the olefinic material may be cooled by an external refrigerant such as liquid ethylene confined in a suitable refrigerating jacket around a reaction vessel. When an internal refrigerant is utilized, its selection is restricted to those substances which are inert with respect to the catalyst. Such refrigerants as liquid ammonia, liquid sulfur dioxide and the like are not useful as internal refrigerants. However, for external refrigerants, all of these materials are useful, particularly under vacuum, to give lower temperatures than their normal boiling points at atmospheric pressure. The olefinic material may also be diluted with inert diluents, and in some instances advantageous characteristics are obtained thereby. Suitable diluents are found in the low freezing alkyl halides such as ethyl, methyl, propyl, or butyl chloride, chloroform, ethylene di-chloride, or in carbon disulfide and various other low freezing point inert substances, including a limited number of the moderately low-boiling hydrocarbons, such as butane, propane and the like.

In conducting the reaction, a purified isoolefin may preferably be used, the isoolefin being mixed in the proportion of 70 to 99½ parts with from 30 to ½ parts of the multiolefin which may preferably be of high purity, but also may be merely commercial grade, containing from 50% to 95% of the desired diolefin, provided the impurities are inert substances, such as the paraffin hydrocarbons. This mixture may be diluted if desired, and then chilled by the application of the refrigerant, either external or internal, to temperatures below −10° C., preferably to temperatures within the range of −40° C. to −103° C.

The chilled olefinic material is then polymerized by the application of the catalyst, which, if it is a dissolved active metal halide catalyst, is added to the rapidly stirred olefinic material, either by direct addition thereto, or preferably by application of the catalyst solution in a well-distributed state such as that produced by an atomization from a spray nozzle in which case the catalyst is applied to the surface of the rapidly stirred olefinic material.

For the catalyst, any of the Friedel-Crafts active metal halides disclosed by N. O. Calloway in his article on the "Friedel-Crafts synthesis," printed in the issue of Chemical Reviews, published for the American Chemical Society at Baltimore in 1935, in volume XVII, No. 3, the article beginning on page 327, the list being particularly well shown on page 375 may be used.

For the catalyst solvent, it is necessary that the solvent be non-complex-forming and low-freezing. To be low-freezing, it is merely necessary that the solvent have a boiling point below 0° C. (below the freezing point of water). To be non-complex-forming, it is merely necessary that there shall not separate from the solution on evaporation of the solvent a compound between the solvent and the Friedel-Crafts catalyst; or that the addition of the solvent in the form of vapor to the solute at constant temperature will lead to a substantially continuous change in the composition of the catalyst phase and to a continuous increase in the partial pressure of the solvent. In general, the catalyst can be recovered unchanged by removal of the solvent (Findlay, "The Phase Rule and Its Application," 6th edition, Longman's Green & Company, New York). For the catalyst solvent, such substances as methyl chloride, ethyl chloride, carbon disulfide, methylene dichloride, ethylene dichloride, chloroform, tertiary butyl chloride and various of the lower hydrocarbons are useful. Any solvent capable of dissolving up to 0.05% of the active halide catalyst under conditions designed to avoid decomposition thereof and having a freezing point below about 0° C. and containing no oxygen is useful. The list of solvents includes substantially all of the halogenated hydrocarbons of less than 7 carbon atoms.

The mixture of isobutylene with the described multiolefin may be used as such, at the indicated temperatures for the polymerization reaction. Usually, however, it is preferable to add a diluent since the resulting polymer tends to be superior in properties. For the diluent, such substances as methyl chloride, methyl bromide, ethyl chloride, methylene dichloride, ethylene dichloride, chloroform, carbon disulfide or the lower hydrocarbons which are liquid at the reaction temperature may be used. As is the case with the catalyst solvent, it is only necessary that the diluent be non-complex-forming with the catalyst substance; and it is necessary that the diluent be liquid at the reaction temperature, rather than merely liquid below 0° C., as is the case with the catalyst solvent.

The polymerization reaction occurs within a very short period of time at these low temperatures to yield an interpolymer of high molecular weight, the average viscosity molecular weight (or Staudinger molecular weight number) ranging from 20,000 to 250,000 or more, the upper limit being as yet unknown. When the polymerization is completed, the polymer material is recovered by volatilization of any unpolymerized isoolefin or diolefin, and by volatilization of the diluent refrigerant catalyst and by volatilization of the solvent as well. The amount of catalyst used is relatively very small, and may be partly removed by a simple washing treatment of the polymer.

As so obtained, the polymer is a coherent mass of material which is white in color and has a good elongation, but does not have an elastic limit, being plastic under pressure or tension. It is capable of being cured by a heat treatment with sulfur, or with an organic compound containing a quinonoid nucleus of the benzene or naphthalene series, or a dinitroso compound to produce a material which does have an elastic limit, and also a good abrasion and flexure resistance.

It is to be noted that this polymeric material is a low unsaturation, linear type hydrocarbon or olefinic hydrocarbon having an iodine number ranging from 1 to 50 or 60, depending upon the amount of diolefin copolymerized into the polymer. This very low iodine number is in contrast with the iodine number of the original isobutylene which is approximately 450, and with the iodine number of butadiene or isoprene monomer, in either of which it is approximately 900, and in contrast with rubber which has an iodine number of approximately 350 to 370. This outstanding difference in iodine number is significant in that it shows conclusively that the material is not an artificial rubber, but is a wholly different substance, being a low unsaturation polymer as distinguished from the highly unsaturated natural rubber substances. Furthermore, while the interpolymeric material reacts with sulfur, the reaction is different from that of sulfurizing rubber, since the vulcanization as it occurs in rubber is dependent upon the high degree of unsaturation of the rubber, and the sulfur serves to saturate a portion only of the double bonds in the rubber, whereas the olefinic polymer here disclosed is nearly completely saturated, but will absorb sulfur which can be combined with the few double bonds which produce the small amount of unsaturation present.

For the curing agent, various substances are available. The principal curing agent is elemental sulfur, preferably in the presence of an appropriate sulfurization aid such as tetramethyl thiuram disulfide or selenium tetra ethyl dithiocarbamate, or tetra methyl thiuram mono sulfide, or zinc dimethyl di thiocarbamate, or zinc dibutyl di thio carbamate, or di penta methylene thiuram tetra sulfide. These substances are representative of a considerable list of sulfurization aids which are more or less effective in reducing the curing time.

Alternatively, the quinone dioxime substances may be used. Tests have shown that preferable substances are quinone esters or quinone inorganic salts. These compounds yield an excellent curing effect without the presence of sulfur. The exact method of operation is still unknown but apparently these compounds produce a cross-linkage between adjacent copolymer chain molecules, the exact reaction, however, being uncertain.

Similarly useful are the dinitroso compounds such as dinitroso cymene, dinitroso benzene, and the like. Tests have shown that a valuable curing effect can be obtained by any dinitroso compound, whether aromatic or aliphatic, although, of course, there is a difference in the efficiency and speed of curing; a difference in the obtainable tensile strength, and a difference in the cost of the various dinitroso compounds. It may be noted further that only the meta and para forms of the aromatic quinones and dinitroso compounds are stable, since the ortho compounds tend strongly to form secondary rings and therefore other compounds which are not dioximes or dinitroso compounds.

In the commercial production of these copolymers, they are usually produced in continuous apparatus in which a stream of mixed olefins and diluent is delivered to a refrigerant jacketed reactor with an auxiliary stream of catalyst solution, the contents of the reactor being powerfully stirred and circulated. The continuing streams result in a continuing overflow of solid polymer, slurried in a mixture of unreacted unsaturates, diluent (if used) and catalyst solvent. This overflow is usually discharged into a tank of warm water to volatilize out everything but the solid polymer and convert the slurry of polymer in hydrocarbons into a slurry of polymer in water. This water slurry is then strained, or filtered, and passed through a drying oven to remove as much as possible of the moisture.

The polymer, after separation from the water slurry and drying, is then ready for the heavy milling treatment of the present invention. The essence of the present invention is the application to the polymer of a heavy mechanical working treatment at an elevated temperature sufficient to destroy the blistering tendency.

As above pointed out, this heavy mechanical working is conveniently applied in the Banbury type mill, the milling being conducted at temperatures between about 150° C. and 200° C. for time intervals ranging from 5 minutes to 30 minutes, the length of time usually being inversely proportional to the temperature. Alternatively, the milling may be conducted upon the standard double roll mill, again at temperatures within the range between 150° C. and 200° C. for time intervals ranging from 5 to 30 minutes. It may be noted that the heavy pressures are indicated by the pressure required to produce a 50% reduction in thickness of the polymer layer on the front roll in the double roll mill and it appears that the Banbury treatment applies similar pressures. Alternatively, the ordinary Werner and Pfleiderer type of kneading machine may be used, although undesirably high temperatures and time lengths are usually required. Alternatively, also, mechanism of the taffy-pulling type may also be used. However, this requires a preliminary milling and plasticizing step and the use of auxiliary heating equipment and it is therefore less desirable commercially. Other means for applying heavy working treatment to the copolymer will be evident to those skilled in the art; the essence of the invention being the application to the polymer of heavy mechanical working at temperatures within the range between 150° C. and 200° C. for time intervals between 5 minutes and 30 minutes.

It may be noted that this heavy milling step is preferably applied to the polymer before any of the compounding and curing ingredients are added and is necessarily applied before the curing agents are mixed in. The presence of compounding agents is somewhat undesirable since they may tend to complicate the milling problems and lengthen the time required for the desired results. The curing agents must be absent from the mixture during the heavy milling step since otherwise the material will "scorch" and "set up" on the mill in a vulcanization reaction which destroys the usefulness of the polymer.

The milling step may, if desired, be conducted upon the polymer as it is received from the dryers, without the presence of any auxiliary agents. This, however, is less satisfactory than a treatment in the presence of a stabilizer such as phenyl beta naphthyl amine or 2,4-di-tertiary butyl para cresol, or triphenyl phosphite, or the like in concentration ranging from 0.05% to 1% or 2%. It may be noted that the heavy milling treatment tends to yield a slight molecular weight breakdown in the polymer. If, as is sometimes the case, the molecular weight from the polymerizer is high enough to make the material leathery and hard to process, this incidental breakdown is helpful. If, on the other hand, the molecular weight, as received from the polymerizers, is about right for convenient processing, any further breakdown is avoided by the use of an inhibitor of the above-mentioned type. When the polymerizers are operating satisfactorily, it is usually possible to forecast the character of the polymer to be obtained, and add an appropriate amount of inhibitor; since, however, the inhibitor is also valuable for protecting the polymer during storage, before curing, it is usually added at some convenient stage between the primary polymerization reaction and the delivery to the mills.

When the heavy milling step is completed, the polymer is ready for compounding and curing. A suitable compounding recipe is as follows:

| | Parts |
|---|---|
| Copolymer | 100 |
| Stearic acid | 0 to 10 |
| Zinc oxide | 0 to 10 |
| Carbon black | 0 to 200 |
| Curing agents | 0.5 to 5 |

This recipe shows the usual range of ingredients. A specific desirable recipe is:

| | Parts |
|---|---|
| Copolymer (3 molecular per cent isoprene) | 100 |
| Stearic acid | 5 |
| Zinc oxide | 5 |
| Carbon black | 50 |
| Sulphur | 3 |
| Tetra methyl thiuram disulfide | 1 |

The compounding is conducted in any convenient manner and may be a subsequent step following immediately after the heavy milling treatment in the same equipment which applied the heavy milling treatment. Preferably, however, the polymer is taken from the mill after the heavy milling treatment and cooled. Thereafter, the polymer may be compounded according to the above recipe or variants thereof, as desired, in the usual compounding equipment.

It should be noted that the mill, and especially the polymer thereon, should be cooled to about 110° C. before the accelerator is added, since otherwise the polymer tends to "set up" on the mill. After the compounding step, the polymer is given the usual forming treatment such as by molding, or calendering onto fabric or other processes and it is thereafter cured. The curing reaction is usually conducted at temperatures ranging from 300 to 350° F., depending upon the product being made, the character of the curing agent, and other factors, for a time within the range between three minutes and two hours, depending upon the curing agents used, and the use to be made of the cured material.

Example 1

The present invention introduces into the treatment of the polymer a particular type of processing step. When the polymerization reaction has been completed and the volatile solvents removed, and preferably also the catalyst had been removed, the polymer material is introduced into a Banbury type of mixer, and milled in the Banbury mixer at a temperature ranging between 150° C. and 200° C., for a period of from 5 to 30 minutes. At such temperatures the polymeric material has a high degree of plasticity, and under the mixing and compressive forces developed in the Banbury mill a homogenization of the polymer material occurs which greatly improves the physical characteristics of the polymer after it has been cured. In sharp contrast with other rubbery materials, no substantial change in molecular weight is produced by the milling treatment, but instead the material retains substantially the original molecular weight, and does not sustain any degradation in molecular weight, nor any increase in plasticity but does obtain a very important gain in ultimate tensile strength after curing.

The exact function of this specific treatment is as yet unknown but it seems probable that in the course of the polymerization reaction a small amount, probably only a fraction of 1%, of polymeric material of relatively low molecular weight is produced. This material, if it is produced, is of sufficiently low molecular weight to be physically in the form of a very viscous oil, rather than in the form of the solid elastic material which is the form taken by the remainder of the polymer material. It may also be that this oily polymer material is slightly volatile or unstable at the curing temperature, perhaps sufficiently volatile or unstable to develop small bubbles within the body of the composition. It further seems probable that this material, if produced, occurs in segregated small droplets within the body of the polymer, perhaps being produced at some particular stage of the polymerization reaction, and perhaps produced at some critical local concentration of catalyst, diluent and mixed olefinic materials in the body of the polymerization liquid.

It is likewise possible that the low molecular weight oily polymer material is capable of reacting with sulfur or other compounding ingredients or both to cause the evolution of a gaseous substance. It is known, for example, that the incorporation of small amounts of unsaturated substances such as vegetable oils, oleic acid or dipentene into the interpolymer prior to curing causes a very marked porosity in the structure of the interpolymer during the curing process.

If these above-suggested phenomena do occur, it is probable that the milling treatment applied at the high temperature disperses the droplets of oil polymer uniformly throughout the mass of polymeric material, thereby destroying any local comparatively high concentration which might otherwise be sufficiently great to produce bubbles. Alternatively, it may be that the milling operation at high temperature volatilizes and drives off or chemically reacts with part at least of any troublesome, low molecular weight, oily constituents which may be present. The above theories are advanced as tentative suggestions of possible reasons for the improvement discovered by the treatment; but have not as yet been proven.

In any event, this isoolefinic type of polymer is greatly improved in its physical characteristics by a treatment of such severity as to be detrimental to the physical properties of other comparable substances such as natural rubber or synthetic rubbers, all of which are harmed by such drastic treatment both as to the severity of the pressure, the temperature and the prolonged time of application of temperature and milling pressure.

When the milling in the Banbury mixer has been completed, the material may be removed from the mill and allowed to cool. It may then be compounded, extruded and cured at the user's convenience without the development of blisters or other difficulties which reduce the obtainable tensile strength.

Example 2

The value of hot milling as a means of stabilizing the interpolymers of the present invention to prevent deterioration during storage was established for a period over three months.

| Description of Sample | 30' Cure at 155° C. | | 60' Cure at 155° C. | |
|---|---|---|---|---|
| | Tensile | Per Cent Elong. | Tensile | Per Cent Elong. |
| Butadiene-isobutylene interpolymer original evaluation (after Banbury Treatment) | 2,850 | 1,050 | 3,100 | 1,000 |
| Butadiene-isobutylene interpolymer after Banbury Treatment (a) followed by aging (b) | 2,600 | 1,000 | 2,900 | 1,000 |
| Butadiene-isobutylene interpolymer, after modified Banbury treatment (c) followed by aging (b) | 2,100 | 1,025 | 2,900 | 1,000 |
| Butadiene-isobutylene interpolymer aged without Banbury Treatment (b) followed by Banbury Treatment and standard evaluation | Blistered | | | |

(a) 100 parts Banburied 20 minutes at 130–140° C. with sulfur (1.5 parts), zinc oxide (5.0 parts), and stearic acid (3 parts).
(b) Shelf aging for 3½ months.
(c) 100 parts Banburied 20 minuted at 130–140° C. with sulfur (1.5 parts) only.

These values show the deterioration of the interpolymer upon storage in the absence of a preliminary milling treatment; and show the excellent retention of tensile strength and elongation when the milling treatment is applied soon after the polymerization step.

As above pointed out, this milling, or Banbury treatment step, is applicable to all of the predominantly isoolefinic copolymers if they are solid, and reactive in a curing reaction.

Example 3

In an alternative embodiment, a polymerization mixture was prepared comprising purified isobutylene in the proportion of 95 to 99½ parts, and isoprene in the proportion of 5 parts to ½ part. As above pointed out, this mixture was preferably prepared from isobutylene of a maximum purity, containing as little of the normal mono-olefins as possible. The material contained from 96% to 99.5% of isobutylene. The isoprene may be of a high degree of purity, or the material used may contain from 50% to 95% of isoprene, the remainder being inert impurities. This mixture was chilled as before to temperatures ranging from −50° C. to −150° C., diluted with a diluent-refrigerant such as liquid ethylene or liquid propane and solid carbon dioxide or other suitable refrigerant composition. The mixture was then polymerized by the addition of the Friedel-Crafts type catalyst solution as before. This polymerization procedure produced a copolymerizate which was closely similar to the previously described copolymerizate, in that it could be milled as above described and compounded with sulfur and cured to develop an elastic limit, and high tensile strength, high elasticity, high abrasion and flexure resistance, all of which are influenced by the milling treatment.

Various portions of the polymer material as above produced were compounded with sulfur and a sulfurization aid, some with and some without filler substances, others with organic quinonoid nucleus compounds of the benzene and naphthalene series, including para-quinone dioxime both with and without an oxidizing agent such as lead peroxide, and when so compounded the compound was cured by heat, whereupon there was developed in the cured material a definite elastic limit, a high elasticity and a high tensile strength as well as the above-mentioned high resistance to flexure and abrasion. The sulfur curing reaction required a relatively high temperature, and a relatively long time of reaction. With sulfur alone, the temperature required was in the neighborhood of 160° C. and the time was four or more hours. The Banbury treatment was desirably conducted at a slightly lower temperature for a substantially shorter length of time, and accordingly the sulfur may safely be added to the polymer mixture during the course of the Banbury treatment. It was found, however, that the sulfurization and curing were greatly facilitated by the presence of one or more of a specific group of compounds, that is, the thiuram compounds such as tetramethyl thiuram disulfide. The presence of approximately 1% of this sulfur-containing substance increased the rate of cure to such an extent that it was completed in from 15 to 30 minutes at a temperature ranging from 140° C. to 170° C. In view of these facts, it is desirable that the organic sulfur compound of the group above mentioned should not be added to the hot polymer either with or without additional filler substances. Instead it is desirable that the sulfurization aid be added only after the material has been considerably cooled, and that it be added with the minimum amount of further milling at elevated temperatures. It is found, however, that the sulfurization aiding compound above-mentioned may safely be added to the polymer material on the mill by adding it when the material has been cooled to or below a temperature of 110° C. if the milling at this temperature does not continue for longer than approximately 5 minutes.

Alternatively, of course, the material may be removed from the Banbury mill after the milling treatment and cooled in any convenient way. Thereafter, it may be stored as desired, and when ready for curing, the sulfurization aid may be incorporated by short working in a relatively cool Banbury mill, or upon the ordinary roll mill, as is most convenient.

These examples above presented are given as representative disclosures of the invention, but the invention as such is not limited to the small number of polymeric substances above-mentioned. In fact, the invention is applicable to any of the predominantly isoolefinic copolymers with polyolefins as a general procedure. Accordingly, the use of the words "copolymer" or "interpolymer" refers to any predominantly isoolefinic copolymer.

Example 4

A convenient and desirable formula for producing a compounded polymeric material is as follows:

| | Parts |
|---|---|
| Isobutylene-isoprene copolymer | 100 |
| Zinc oxide | 5 |
| Stearic acid | 3 |
| Sulfur | 3 |
| Tetramethyl thiuram disulfide, added after milling to the cold, milled, product | 1 |

This material mixed in a cool Banbury mixer or upon an ordinary roll mill blisters badly and cannot be properly cured.

If the polymer alone is milled in the Banbury (for example, 25 minutes at 160° C.) and then the compounding materials added and mixed in with the minimum of further milling and at a lower temperature, the material can be cured with only occasional blisters or bubbles and the material is generally satisfactory. If the polymer is mixed in the Banbury mill with the fillers (zinc oxide and stearic acid) at a temperature of, for example, 160° C. for 25 minutes, then cooled and the sulfurization aid mixed in, the material is of phenomenally high grade and shows a tensile strength in the neighborhood of 3,460 pounds per square inch with an elongation of 980%.

This procedure may conveniently be summarized in the following table:

| Material | Results (Cured 1 hr. at 155° C.) |
|---|---|
| #1. Copolymeric material mixed with all compounding and vulcanizing ingredients 3% stearic acid, 3% sulfur, 5% zinc oxide and 1% Tuads. | Blisters badly (generally impossible to sulfurize properly). |
| #2. Polymeric material kneaded in Banbury alone for 25 minutes at 160° C. then mixed on mill with all compounding ingredients. | Can be cured with only occasional blistering (but generally satisfactory). |
| #3. Treated[1] in Banbury at 160° C. with sulfur, stearic acid and zinc oxide, after treatment and cooling, accelerators are milled in. | Tensile strength 3460 lbs. sq. in. Elongation 980%. |

[1] Good results are often obtained by Banbury treating with any one or any combination of the compounding ingredients. However, the most satisfactory results are obtained by using all three.

*Note:* By the method of item #1 above the tensile strength cannot ordinarily be determined due to flaws, blisters, etc., whereas, by the method in item #2, the tensile strength was 2700 lbs./sq. in. This value is satisfactory for some purposes and therefore this method can be employed. However, for maximum tensile strength the method in item #3 is preferred.

The polymeric materials when treated in accordance with the present invention are highly advantageous substances for the wide variety of uses where strong, elastic material is required, such uses including automobile tires and tubes, waterproof and chemical-proof fabrics, and elastic bodies generally.

It will be observed that two different kinds of mill machinery are mentioned; the Banbury mill, and the open mill.

An open mill consists of two parallel steel rollers rotating in opposite directions, one revolving slightly faster than the other. A Banbury mixer is an enclosed kneader-type mill with specially designed blades to duplicate the shearing action of the open mill. In this type of mixer the area exposed to the atmosphere is comparatively small, hence, the polymer being worked is not exposed to so much oxygen as occurs with the open mill. In addition, the rotors and the jacket of the Banbury mill can be heated by passing steam through them to produce the desired high temperature for the milling operation.

The Banbury mill is superior to the open mill for the drastic milling treatment above pointed out, because of the much more severe milling forces applied, and because of the much less opportunity for the access of atmospheric oxygen to the material. However, similar results can be obtained by high speed working on an open mill with very hot rolls.

Thus the invention provides a new and useful step in a process for the production of synthetic plastics whereby the tensile strength, storage stability characteristics and other properties are valuably improved, by a treatment of a severity which is ordinarily injurious to the valuable characteristics of other reactive plastic and elastic materials.

This application is a continuation in part of application Serial No. 272,610, filed May 9, 1939, and application Serial No. 431,586, filed February 19, 1932, both now abandoned.

While there are above disclosed but a limited number of embodiments of the structure of the invention, it is possible to produce still other embodiments without departing from the inventive concept herein disclosed, and it is therefore desired that only such limitations be imposed upon the appended claims as are stated therein or required by the prior art.

The invention claimed is:

1. In a process for preparing a solid plastic curable hydrocarbon interpolymer of a major proportion of isobutylene with a minor proportion of an aliphatic multi-olefin having from 4 to 14 inclusive carbon atoms per molecule at a temperature within the range between —40° C. and —164° C. in the presence of a polymerization catalyst comprising a Friedel-Crafts active metal halide in solution in a low freezing non-complex forming solvent, the step of milling the curable polymer in the absence of a vulcanization aid at a temperature within the range between 150° C. and 200° C. for time intervals from 5 minutes to 30 minutes under milling pressures great enough to effect a rapid breakdown of caoutchouc and thereafter curing the polymer in the presence of a vulcanization aid, the milling step serving to prevent the development of blisters upon subsequent curing.

2. In a process for preparing a solid plastic curable hydrocarbon interpolymer of a major proportion of isobutylene with a minor proportion of an aliphatic multi-olefin having from 4 to 14 inclusive carbon atoms per molecule at a temperature within the range between —40° C. and —164° C. in the presence of a polymerization catalyst comprising aluminum chloride dissolved in methyl chloride, the step of milling the polymer in the absence of a vulcanization aid at a temperature within the range between 150° C. and 200° C. for time intervals from 5 minutes to 30 minutes under milling pressures great enough to effect a rapid breakdown of caoutchouc and thereafter curing the polymer in the presence of a vulcanization aid, the milling step serving to prevent the development of blisters upon subsequent curing.

3. In a process for preparing a solid plastic curable hydrocarbon interpolymer of a major proportion of isobutylene with a minor proportion of an aliphatic multi-olefin having from 4 to 14 inclusive carbon atoms per molecule at a temperature within the range between —40° C. and —164° C. in the presence of a polymerization catalyst comprising aluminum chloride dissolved in methyl chloride, the step of milling the curable polymer in the absence of a vulcanization aid at a temperature within the range between 150° C. and 200° C. for time intervals from 5 minutes to 30 minutes under milling pressures great enough to effect a rapid breakdown of caoutchouc, the milling step serving to prevent the development of blisters upon subsequent curing; thereafter compounding the milled polymer with a curing agent and curing the compounded polymer by heating to a temperature within the range between 235° F. and 350° F. for a length of time within the range between 3 minutes and 2 hours.

4. In a process for preparing a solid plastic curable hydrocarbon interpolymer of a major proportion of isobutylene with a minor proportion of an aliphatic multi-olefin having from 4 to 14 inclusive carbon atoms per molecule at a temperature within the range between —10° C. and —164° C. in the presence of a polymerization catalyst comprising aluminum chloride dissolved in an alkyl chloride having from 1 to 4, inclusive, carbon atoms per molecule, the step of milling the curable polymer in the absence of a vulcanization aid at a temperature within the range between 150° C. and 200° C. for time intervals from 5 minutes to 30 minutes under milling pressures great enough to effect a rapid breakdown of caoutchouc and thereafter curing the polymer in the presence of a vulcanization aid, the milling step serving to prevent the development of blisters upon subsequent curing.

5. In a process for preparing a solid plastic curable hydrocarbon interpolymer of a major proportion of isobutylene with a minor proportion of butadiene at a temperature within the range between —40° C. and —164° C. in the presence of a polymerization catalyst comprising aluminum chloride dissolved in methyl chloride, the step of milling the curable polymer in the absence of a vulcanization aid at a temperature within the range between 150° C. and 200° C. for time intervals from 15 minutes to 30 minutes under milling pressures great enough to effect a rapid breakdown of caoutchouc and thereafter curing the polymer in the presence of a vulcanization aid, the milling step serving to prevent the development of blisters upon subsequent curing.

6. In a process for preparing a solid plastic curable hydrocarbon interpolymer of a major proportion of isobutylene with a minor proportion of isoprene at a temperature within the range between —40° C. and —164° C. in the presence of a polymerization catalyst comprising aluminum chloride dissolved in methyl chloride, the step of milling the curable polymer in the absence of a vulcanization aid at a temperature within the range between 150° C. and 200° C. for time intervals from 5 minutes to 30 minutes under milling pressures great enough to effect a rapid breakdown of caoutchouc and thereafter curing the polymer in the presence of a vulcanization aid, the milling step serving to prevent the development of blisters upon subsequent curing.

7. In a process for preparing a solid plastic curable hydrocarbon interpolymer of a major proportion of isobutylene with a minor proportion of dimethyl butadiene at a temperature within the range between —40° C. and —164° C. in the presence of a polymerization catalyst comprising aluminum chloride dissolved in methyl chloride, the step of the milling the curable polymer in the absence of a vulcanization aid at a temperature within the range between 100° C. and 200° C. for time intervals from 5 minutes to 30 minutes under milling pressures great enough to effect a rapid breakdown of normal polymer and thereafter curing the polymer in the presence of a vulcanization aid, the milling step serving to prevent the development of blisters upon subsequent curing.

IRVING E. LIGHTBOWN.
WILLIAM J. SPARKS.
ROBERT M. THOMAS.

REFERENCES CITED

The following references are of record in the file of this patent:

UNITED STATES PATENTS

| Number | Name | Date |
|---|---|---|
| 2,276,893 | Thomas | Mar. 17, 1942 |

FOREIGN PATENTS

| Number | Country | Date |
|---|---|---|
| 482,547 | Great Britain | Mar. 28, 1938 |
| 482,573 | Great Britain | Mar. 28, 1938 |